No. 729,914. PATENTED JUNE 2, 1903.
G. F. APPLEGATE.
EYEGLASSES OR SPECTACLES.
APPLICATION FILED MAR. 15, 1900.
NO MODEL. 2 SHEETS—SHEET 1.
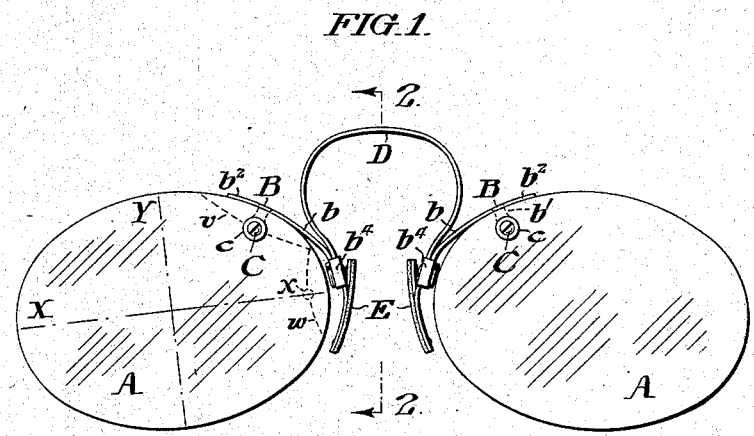
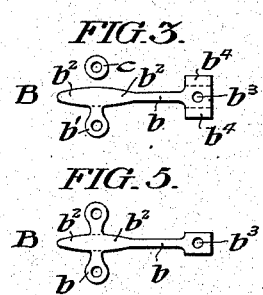
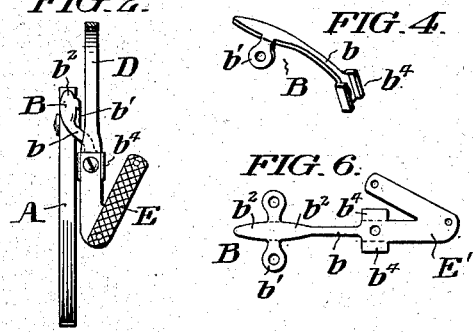
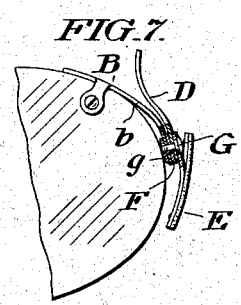
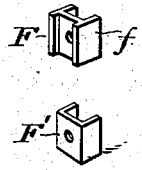
WITNESSES:
Clifton C. Hallowell.
E. L. Fullerton.
INVENTOR:
GEORGE F. APPLEGATE,
By Arthur E. Paige
Atty.

No. 729,914. PATENTED JUNE 2, 1903.
G. F. APPLEGATE.
EYEGLASSES OR SPECTACLES.
APPLICATION FILED MAR. 15, 1900.
NO MODEL. 2 SHEETS—SHEET 2.

WITNESSES:
Clifton C. Hallowell.
E. L. Fullerton.

INVENTOR:
GEORGE F. APPLEGATE,
by Arthur E. Paige
Atty.

No. 729,914. Patented June 2, 1903.

UNITED STATES PATENT OFFICE.

GEORGE F. APPLEGATE, OF TRENTON, NEW JERSEY.

EYEGLASSES OR SPECTACLES.

SPECIFICATION forming part of Letters Patent No. 729,914, dated June 2, 1903.

Application filed March 15, 1900. Serial No. 8,723. (No model.)

*To all whom it may concern:*

Be it known that I, GEORGE F. APPLEGATE, of Trenton, in the State of New Jersey, have invented certain new and useful Improvements in Eyeglasses or Spectacles, whereof the following is a specification, reference being had to the accompanying drawings.

My invention relates to eyeglasses or spectacles of the so-called "frameless" or "rimless" type; and it consists in a frame comprising lens-clamps so constructed and arranged as to engage and support the lenses by a portion of the margin thereof intermediate of the major and minor axes of the lenses, whereby the connection between the lens and the frame is rendered stronger than in the ordinary form of eyeglasses of the type specified, wherein the lens-clamps are located at the major axes of the lenses. Moreover, my invention comprehends certain details of construction of the frame members whereby a desirable range of adjustability is secured at the minimum cost of manufacture, as hereinafter specified.

Figure 10:
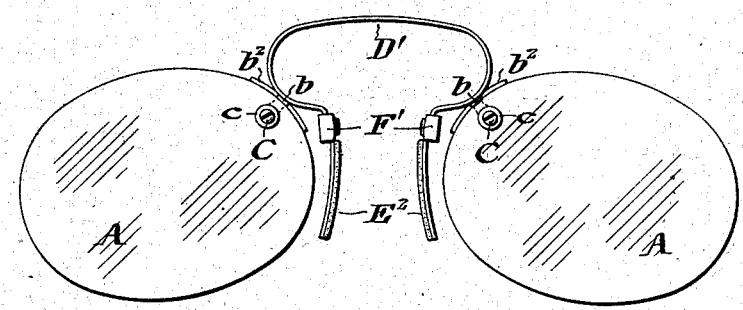
Figure 11:
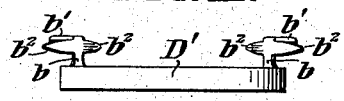
Figure 12:
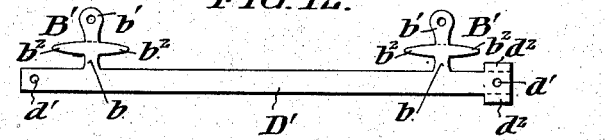
Figure 13:
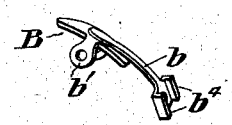
Figure 14:
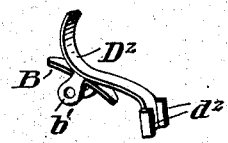

In the accompanying drawings, Figure 1 is a front view of a pair of eyeglasses, showing a convenient form of my invention. Fig. 2 is a sectional view taken on the line 2 2 of Fig. 1. Fig. 3 is a plan view of the stampings comprised in the lens-clamp shown in Fig. 1. Fig. 4 is a perspective view of the lens-clamp shown in Fig. 1. Figs. 5 and 6 show modified forms of lens-clamps. Fig. 7 is a fragmentary view of an eyeglass with the form of clamp shown in Fig. 5 applied thereto. Fig. 8 is a perspective view of the bolt and nut shown in Fig. 7. Fig. 9 shows perspective views of connecting-blocks. Fig. 10 is a front view of a pair of eyeglasses embodying a modified form of my invention. Fig. 11 is a plan view of the frame shown in Fig. 10. Fig. 12 is a plan view of the stamping comprised in the frame shown in Figs. 10 and 11. Figs. 13 and 14 are modified forms of lens-clamps.

In said figures the lines X and Y respectively indicate the major and minor axes of an ordinary lens A. In the type of eyeglasses to which my invention relates such a lens is usually secured to the bridge, &c., by means of a clamp fixed at the margin of the lens upon its major axis X by means of an aperture $x$, drilled through the lens. The strain upon a lens thus secured is such that the majority of fractures thereof occur on the line $w$, extending from said aperture $x$ to the edge of the lens. I have found in practice that a stronger connection than the ordinary one aforesaid can be made between the lens-clamp B and the lens A if the aperture through which the clamp is secured is located intermediate of the major and minor axes of the lens, as shown in Fig. 1. The contour of the lens being of less curvature in said region fracture actually occurs through a greater cross-section of the lens, as indicated by the line $v$. Moreover, it is to be noted that the additional strength of connection between the clamp and the lens is secured without additional encroachment upon the field of the lens. On the contrary, when the lens-clamp is located upon the axis X it serves to obstruct the vision when the eyes are turned from side to side, while with my improved arrangement aforesaid a clear field of vision is secured to the extreme edge of the lens.

In lieu of the ordinary rigid stud extending from the lens-clamps to the point of attachment thereof to the frame I provide the lens-clamps with bendable supporting-arms $b$, as shown in Fig. 1, so that said arms may be shaped by the optician in accordance with the pupillary distance of the eyes of the person fitted.

As shown in Figs. 3 and 4, the body of the lens-clamp is conveniently formed of a single stamping of sheet metal provided with an apertured strap $b'$, which is opposed by the separable washer $c$, beneath the head of the screw C, which extends through the aperture of the lens and is engaged with said strap $b'$. Such an arrangement of the means for securing the clamp to the lens is preferable in that it permits the use of clamps of a single size with lenses of differing thickness, the wings $b^2$ of the clamp serving to engage the edge of the lens regardless of its thickness. I prefer, however, to provide the free extremity of the bendable arm $b$ of the clamps B with an aperture $b^3$, having flanges $b^4$, which in the form of my invention shown in Fig. 1 serve to secure in fixed relation the bridge D and guards E, which are fitted therebetween. However, the extremity of said arm $b$ may be planular, as shown in Fig. 5, and be secured with respect to said bridge and guard by a connecting-block of either of the forms F or F', (shown in Fig. 9,) the former, being fitted between the arm $b$ upon one side and the bridge D and guard E upon the other side, serving by its flanges $f$ to prevent the lateral displacement of said parts, which are assembled by means of the bolt G and nut $g$.

In the form of my invention shown in Fig. 6 the guard E' is formed in integral relation with the clamp B, being, in fact, a continuation of the bendable arm $b$.

In the form of my invention shown in Fig. 10 the frame comprises a bridge D', having its ends perforated, as indicated at $d'$, to receive the connecting-bolts G or similar devices, and the respective lens-clamps B' are formed in integral relation with said bridge D', adjoining the perforated ends thereof. In this form of my invention the bridge D' may be provided with planular ends, as indicated at the left-hand side of Fig. 12, and be connected with the guards $E^2$ by means of blocks F' of the form shown in Fig. 9. However, I prefer to provide said bridge D' with lateral flanges $d^2$ at its perforated extremities, said flanges being fitted to and serving to prevent the lateral movement of the guards $E^2$, connected therewith by bolts or screws.

Fig. 13 shows a lens-clamp which differs from that shown in Fig. 4 in that the bendable arm $b$ is in brazed connection with the strap $b'$ instead of being formed integrally therewith. Fig. 14 shows a similar brazed connection between the bridge $D^2$ and the clamp-strap $b'$.

I do not desire to broadly claim an eyeglass wherein the bridge is connected to the lens at the upper edge of the latter, as I am aware that such an arrangement is old in framed eyeglasses. However, I believe it to be new to provide an eyeglass of the frameless type with the connection between the clamp and the lens arranged as hereinbefore described, whereby said clamps are removed from their ordinary position of obstruction in the field of vision and greater strength of connection between the clamp and the lens is secured, and therefore I do not desire to limit myself to the precise details of construction which I have shown and described. Morever, I do not desire to broadly claim a lens-clamp provided with a bendable supporting-arm; but I do claim the details of construction thereof as specified.

I claim—

1. In an eyeglass or spectacle, the combination with a lens-clamp and a nose-guard; of a block connecting said clamp and said guard and separable from both; flanges upon the opposite sides of said block, extending parallel with each other, respectively fitted to said clamp and guard and arranged to maintain said clamp and guard parallel; and means arranged to secure said clamp, guard and block in fixed relation, substantially as set forth.

2. In an eyeglass or spectacle, the combination with a lens-clamp provided with a strap extending parallel with the face of the lens; of a screw entered through the lens in engagement with said strap; an arm extending from said lens-clamp aside from the plane of the lens at right angles to said strap; a nose-guard; a bridge; and means for securing the free end of said arm, nose-guard and bridge in fixed relation, substantially as set forth.

3. In an eyeglass or spectacle, the combination with a lens-clamp having an arm extending in a plane parallel with the focal axis of the lens; of a bridge and a nose-guard; a connecting-block separate from said clamp, bridge and guard having flanges upon its opposite sides extending parallel with each other, and fitted to said clamp, bridge and guard and arranged to maintain them parallel; and means arranged to secure said clamp, bridge, guard and block in fixed relation, substantially as set forth.

4. In an eyeglass or spectacle, the lens-clamp B, comprising the wing $b^2$, and arranged to embrace the edge of the lens; a strap $b'$, fitted to one side of the lens; the screw C, entered through the lens in engagement with said strap $b'$; the washer $c$, beneath the head of said screw; the flexible supporting-arm $b$, extending from said clamp in a plane parallel with the focal axis of the lens and in a direction opposite to said wing $b^2$; the bridge D; the nose-guard E; and means at the free extremity of said flexible arm $b$, arranged to secure said bridge and guard in fixed relation, substantially as set forth.

GEORGE F. APPLEGATE.

Witnesses:
ARTHUR E. PAIGE,
E. L. FULLERTON.